United States Patent
Di Norscia et al.

(10) Patent No.: US 12,460,821 B2
(45) Date of Patent: Nov. 4, 2025

(54) FUEL INJECTOR PANELS HAVING MICROMIXERS

(71) Applicant: Solar Turbines Incorporated, San Diego, CA (US)

(72) Inventors: Christian Di Norscia, Santee, CA (US); Rajeshriben Patel, San Diego, CA (US); German Verduzco, Chula Vista, CA (US); Robert Fanella, San Diego, CA (US); Peter Sykes, San Marcos, CA (US); Hanjie Lee, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 270 days.

(21) Appl. No.: 18/110,100

(22) Filed: Feb. 15, 2023

(65) Prior Publication Data

US 2024/0271793 A1    Aug. 15, 2024

(51) Int. Cl.
*F23R 3/28* (2006.01)
*F02C 3/22* (2006.01)
(Continued)

(52) U.S. Cl.
CPC ............... *F23R 3/286* (2013.01); *F02C 3/22* (2013.01); *F02C 9/40* (2013.01); *F23R 3/36* (2013.01)

(58) Field of Classification Search
CPC .. F23R 3/286; F23R 3/36; F23R 3/343; F23R 3/10; F23R 2900/00017–19; F02C 7/222
See application file for complete search history.

(56) References Cited

U.S. PATENT DOCUMENTS

| 8,528,336 | B2 * | 9/2013 | Cihlar | F23R 3/283 60/740 |
| 9,103,551 | B2 * | 8/2015 | Berry | F23R 3/283 |

(Continued)

FOREIGN PATENT DOCUMENTS

| GB | 2257502 | 1/1993 |
| WO | 2016138271 A1 | 9/2016 |
| WO | 2022214384 A1 | 10/2022 |

OTHER PUBLICATIONS

Steinthorsson et al. "Micro-Mixing Lean-Premix System for Ultra-Low Emission Hydrogen/Syngas Combustion." Parker Aerospace. Sep. 23, 2010. 68 pages.

(Continued)

*Primary Examiner* — Gerald L Sung
*Assistant Examiner* — Jingchen Liu

(57) ABSTRACT

Fuel injection for hydrogen-gas fuels poses risks with regard to emissions, flashback, and flame-holding events in a gas turbine engine. Accordingly, embodiments of a fuel injection system are disclosed that uniformly mix gas and fuel, while stabilizing a flame and facilitating maintenance. The fuel injection system may comprise a plurality of micromixer panels, mounted in windows of a frame that are arranged circumferentially around a longitudinal axis of the gas turbine engine. Each micromixer panel may comprise a plurality of axial channels, arranged around a central pilot body that is fixed in a grommet. Two or more internal fuel feeds may supply fuel to distinct subsets of fuel jets within the outlets of the axial channels, such that the fuel injection system may be operated in multiple stages.

17 Claims, 7 Drawing Sheets

(51) Int. Cl.
    *F02C 9/40*    (2006.01)
    *F23R 3/34*    (2006.01)
    *F23R 3/36*    (2006.01)

(56) References Cited

U.S. PATENT DOCUMENTS

| | | |
|---|---|---|
| 9,810,186 B2 | 11/2017 | Mansour et al. |
| 10,458,655 B2 | 10/2019 | Boardman et al. |
| 10,465,909 B2 | 11/2019 | Boardman et al. |
| 2010/0223929 A1* | 9/2010 | Bailey .................... F23D 11/38 60/737 |
| 2012/0258409 A1 | 10/2012 | Mansour et al. |
| 2013/0167539 A1* | 7/2013 | Berry ...................... F23R 3/286 60/737 |
| 2017/0276357 A1 | 9/2017 | Berry et al. |
| 2017/0276369 A1* | 9/2017 | Berry ........................ F23R 3/10 |
| 2017/0299186 A1 | 10/2017 | Berry et al. |
| 2023/0250959 A1* | 8/2023 | Shin ........................ F23R 3/346 60/737 |

OTHER PUBLICATIONS

Berger. "Scaling of an Aviation Hydrogen Micromix Injector Design for Industrial GT Combustion Applications." Aerotecnica Missili & Spazio (2021) 100:239-25. Aug. 28, 2021. 13 pages.
Written Opinion and International Search Report for Int'l. Patent Appln. No. PCT/US2024/014127, mailed Jun. 7, 2024 (16 pgs).

* cited by examiner

FUEL INJECTOR PANELS HAVING MICROMIXERS

TECHNICAL FIELD

The embodiments described herein are generally directed to gas turbine engines, and, more particularly, to a dry low emissions, natural gas and high hydrogen fuel injection system in the combustor of a gas turbine engine.

BACKGROUND

Fuel injection and the combustion of hydrogen gas fuels poses risks with regards to nitrogen oxide emissions, flashback, and flame-holding events.

U.S. Patent Publication No. 2012/0258409 describes a high-hydrogen fuel injector for a gas turbine engine. The combustor assembly includes a combustor dome with conical injector modules, each module having a plurality of micro-mixing nozzles with axes pointing radially inward or outward with respect to a main axis of the injector and a plurality of micro-mixing nozzles having axes extending axially with respect to the main axis of the injector.

The present disclosure is directed toward overcoming one or more problems discovered by the inventors.

SUMMARY

In an embodiment, a micromixer panel comprises: a plurality of channels from a first side to a second side of the micromixer panel, wherein each of the plurality of channels provides fluid communication from one of a plurality of inlets on the first side to one of a plurality of outlets on the second side; and an aperture through a central portion of the micromixer panel, wherein the aperture is configured to fit a pilot body.

In an embodiment, a micromixer panel comprises: a plurality of channels from a first side to a second side of the micromixer panel, wherein each of the plurality of channels respectively provides fluid communication from one of a plurality of inlets on the first side to one of a plurality of outlets on the second side; a plurality of fuel jets, wherein each of the plurality of fuel jets is positioned within a respective one of the plurality of outlets; two or more radial inlets through a surface of the micromixer panel; and two or more internal fuel feeds, wherein each of the two or more internal fuel feeds provides fluid communication between a different one of the two or more radial inlets and a different subset of the plurality of fuel jets than others of the two or more internal fuel feeds; an aperture through a central portion of the micromixer panel; a grommet mounted within the aperture; and a pilot body fitted within the grommet.

In an embodiment, a gas turbine engine comprises: a compressor; a turbine; and a combustor positioned between the compressor and the turbine along a longitudinal axis of the gas turbine engine, wherein the combustor includes a fuel injection system, and wherein the fuel injection system comprises an outer liner comprising a plurality of first radial apertures, an inner liner, an annular frame positioned between the outer liner and the inner line along a radial axis that is orthogonal to the longitudinal axis, wherein the annular frame includes an outer ring comprising a plurality of second radial apertures, an inner ring, and a plurality of spokes extending between the outer ring and the inner ring, wherein the outer ring, the inner ring, and pairs of adjacent ones of the plurality of spokes define a plurality of windows circumferentially arranged around the longitudinal axis, and wherein each of the plurality of second radial apertures is radially aligned with one of the plurality of first radial apertures to define respectively a radial channel into one of the plurality of windows, and a plurality of micromixer panels, wherein each of the plurality of micromixer panels is mounted within a respective one of the plurality of windows, and wherein each of the plurality of micromixer panels includes a plurality of axial channels from a first side to a second side of the micromixer panel, wherein each of the plurality of axial channels respectively provides fluid communication from one of a plurality of inlets on the first side to one of a plurality of outlets on the second side, a plurality of fuel jets, wherein each of the plurality of fuel jets is positioned within a respective one of the plurality of outlets, two or more radial inlets through a surface of the micromixer panel, wherein each of the two or more radial inlets is aligned with a respective one of the radial channels, two or more internal fuel feeds, wherein each of the two or more internal fuel feeds provides respectively fluid communication between a different one of the two or more radial inlets and a different subset of the plurality of fuel jets than others of the two or more internal fuel feeds, an aperture through a central portion of the micromixer panel, a grommet mounted within the aperture, and a pilot body fitted within the grommet.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
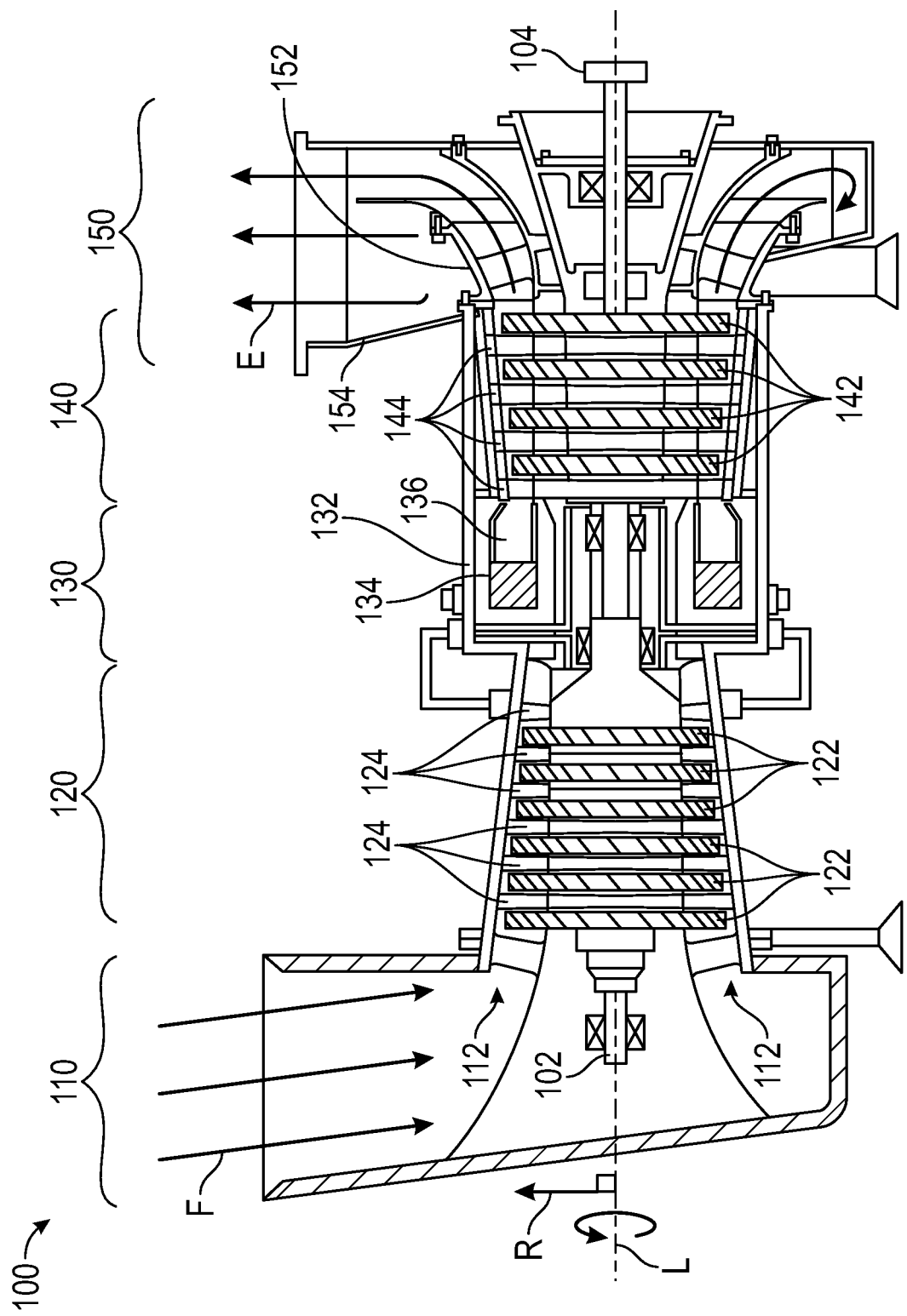
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, as used herein, the terms "respective" and "respectively" signify an association between members of a group of first components and members of a group of second components. For example, the phrase "each component A connected to a respective component B" would signify A1 connected to B1, A2 connected to B2, . . . and AN connected to BN.

It should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along an axial axis that is parallel to longitudinal axis L, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses a fuel injection system 134. Fuel injection system 134 may be a dome that includes one or more, and generally a plurality of, fuel injectors that may be arranged circumferentially around longitudinal axis L within combustor case 132 at equidistant intervals. Combustor case 132 diffuses working fluid F, and fuel injection system 134 injects fuel into working fluid F. In an exemplary embodiment, the injected fuel may be a gaseous fuel comprising hydrogen or hydrogen blend(s). This injected fuel is ignited to produce a combustion reaction in one or more combustion chambers 136. The product of the combustion reaction drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
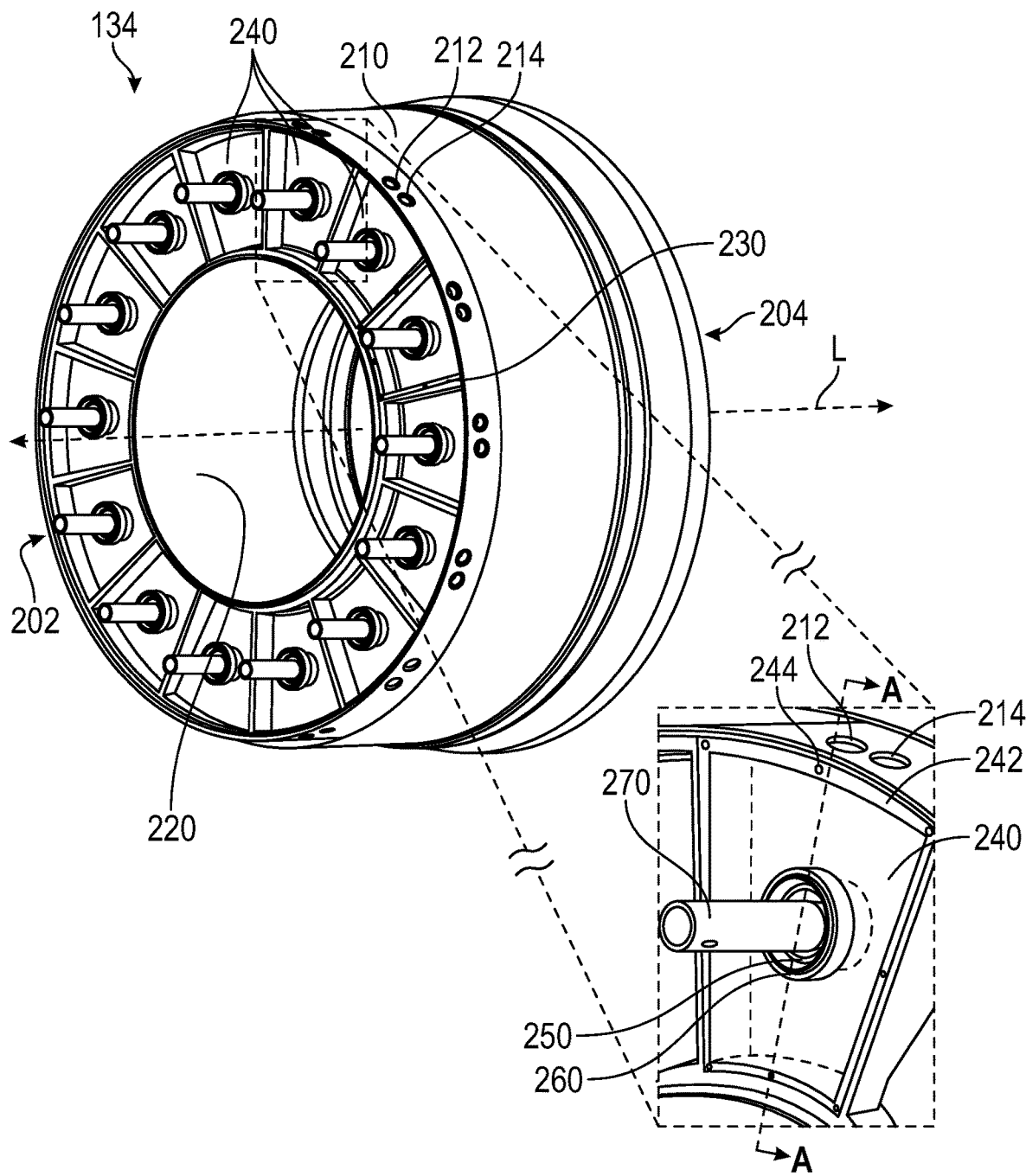
FIG. 2 illustrates a perspective view of a fuel injection system, according to an embodiment.

FIG. 2 illustrates a perspective view of fuel injection system 134, according to an exemplary embodiment. Fuel injection system 134, and, more specifically, frame 230, has a first end 202 and a second end 204, along longitudinal axis L. In an embodiment, first end 202 is the forward end (i.e., closer to compressor 120), and second end 204 is the aft end (i.e., closer to turbine 140). Fuel injection system 134 comprises an outer liner 210 and an inner liner 220. In addition, fuel injection system 134 comprises a frame 230, sandwiched between outer liner 210 and inner liner 220, along a radial axis that is orthogonal to longitudinal axis L. In other words, outer liner 210 and inner liner 220 are mounted around frame 230. Each of outer liner 210, inner liner 220, and frame 230 is annular and concentric around longitudinal axis L.

Outer liner 210 may comprise a plurality of sets of apertures, illustrated as pairs of radial apertures 212 and 214. Each set of radial apertures may be equidistantly spaced apart around the circumference of outer liner 210. In the illustrated embodiment, each set of radial apertures consists of a pair of radial apertures 212 and 214. However, in an alternative embodiment, each set may consist of one or three or more radial apertures.

Frame 230 is configured to hold a plurality of micromixer panels 240. Each micromixer panel 240 is shaped to fit within an annulus sector of frame 230, such that a plurality of micromixer panels 240 can be arranged circumferentially around longitudinal axis L. Each micromixer panel 240 may be fitted with a grommet 250 and retaining ring 260, which hold a pilot body 270 extending beyond first end 202 (e.g., upstream) of micromixer panel 240. Pilot body 270 may be configured to connect to a pilot-fuel supply system on first end 202. The faces of micromixer panels 240 may be coated with a thermal barrier coating.

Each micromixer panel 240 may comprise a flange 242 that fits flush against a surface on first end 202 of frame 230, when micromixer panel 240 is installed within frame 230. Flange 242 may comprise a plurality of holes 244 that align with holes in first end 202 of frame 230. Flange 242 may be fixed to frame 230 via screws, bolts, or other fastening means through the aligned holes. Alternatively, flange 242 may be omitted, and micromixer panels 240 may be fixed to frame 230 via other means, such as lock plates that can be fastened to both the first end 202 of frame 230 and the first end 202 of micromixer panels 240.

Figure 3:
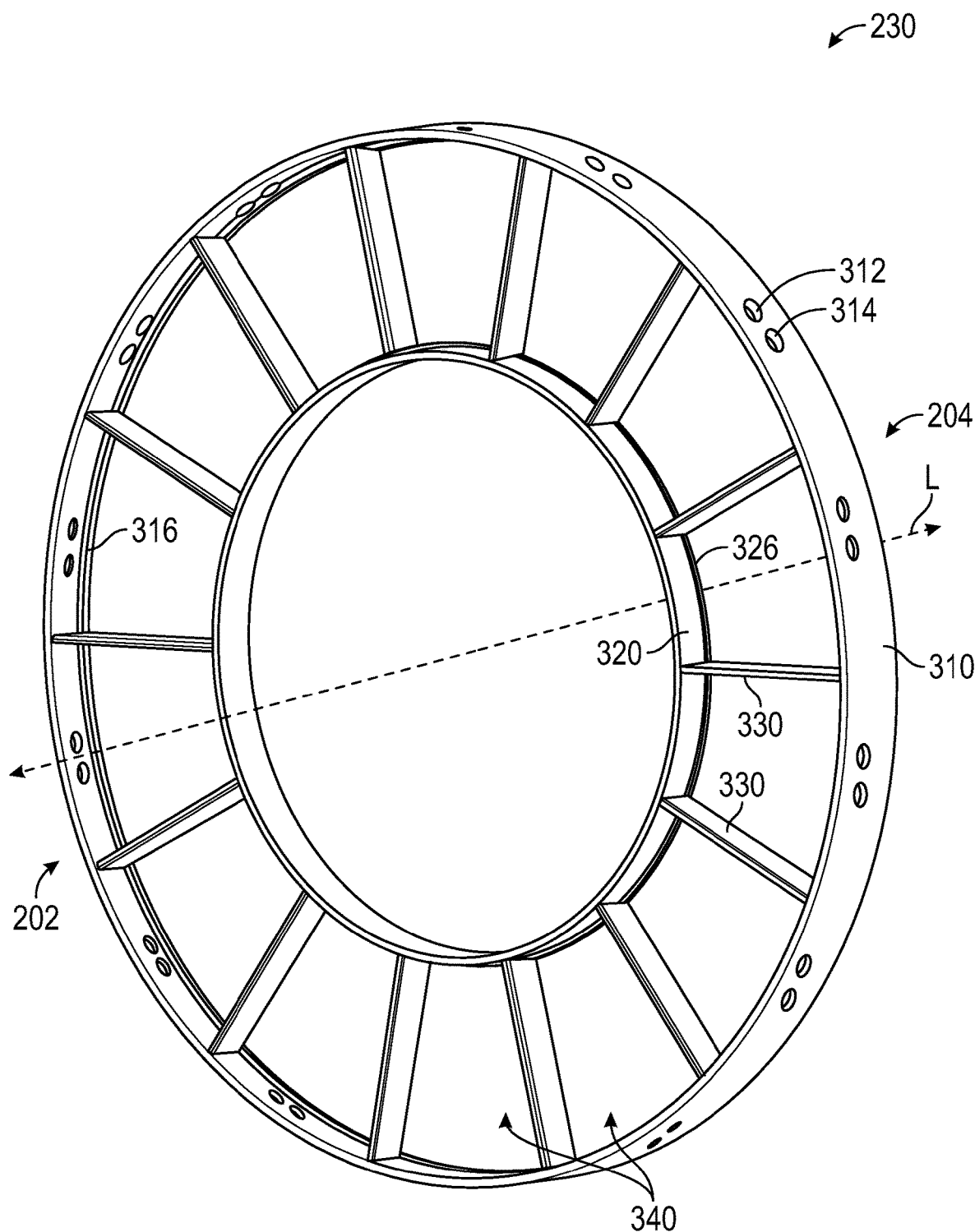
FIG. 3 illustrates a perspective view of a frame of the fuel injection system, according to an embodiment.

FIG. 3 illustrates a perspective view of frame 230 in isolation, according to an embodiment. Frame 230 may comprise an outer ring 310, having a first diameter, and an inner ring 320, having a second diameter that is smaller than the first diameter. Outer ring 310 and inner ring 320 are concentric around longitudinal axis L. Outer ring 310 and inner ring 320 are joined by a plurality of spokes 330 (e.g., fourteen spokes 330) that each extend radially between outer ring 310 and inner ring 320. The plurality of spokes 330 may be equidistantly spaced apart around longitudinal axis L.

Outer ring 310, inner ring 320, and each pair of adjacent spokes 330 define a window 340, such that a plurality of windows 340 are formed in frame 230, at equidistant intervals, around longitudinal axis L. It should be understood that the number of windows 340 will be identical to the number of spokes 330 (e.g., fourteen of both). Each window 340 represents an annulus sector of frame 230. All windows 340 may be identical in shape and dimensions.

Outer ring 310 may comprise a plurality of sets of radial apertures, illustrated as pairs of radial apertures 312 and 314. Each set of radial apertures may be equidistantly spaced apart around the circumference of outer ring 310. In the illustrated embodiment, each set of radial apertures consists of a pair of radial apertures 312 and 314. However, in an alternative embodiment, each set may consist of one or three or more radial apertures.

Each set of radial apertures in outer ring 310 aligns with a set of radial apertures in outer liner 210. For example, in the illustrated embodiment, each radial aperture 312 in outer ring 310 aligns with a corresponding radial aperture 212 in outer liner 210, and each radial aperture 314 in outer ring 310 radially aligns with a corresponding radial aperture 214 in outer liner 210. When a radial aperture 212 is radially aligned with a radial aperture 312, a channel is formed that defines a first flow path through outer liner 210 and outer ring 310 into a window 340. Similarly, when a radial aperture 214 is radially aligned with a radial aperture 314, a channel is formed that defines a second flow path through outer liner 210 and outer ring 310 into a window 340.

Each micromixer panel 240 is configured, in terms of shape and size, to fit within a window 340. Outer ring 310 may comprise a lip 316 that extends radially inward from second end 204 of outer ring 310. Similarly, inner ring 320 may comprise a lip 326 that extends radially outward from second end 204 of inner ring 320. Thus, a micromixer panel 240 may be slid into a window 340 from first end 202 of frame 230, until the micromixer panel 240 abuts lips 316 and 326 on second end 204. Lips 316 and 326 prevent micromixer panel 240 from sliding through second end 204 of frame 230. Thus, micromixer panel 240 may be fixed in window 340 by lips 316 and 326 on second end 204 of frame 230 and the fastening of flange 242 (or lock plates or other fastening means) to first end 202 of frame 230.

Figure 4:
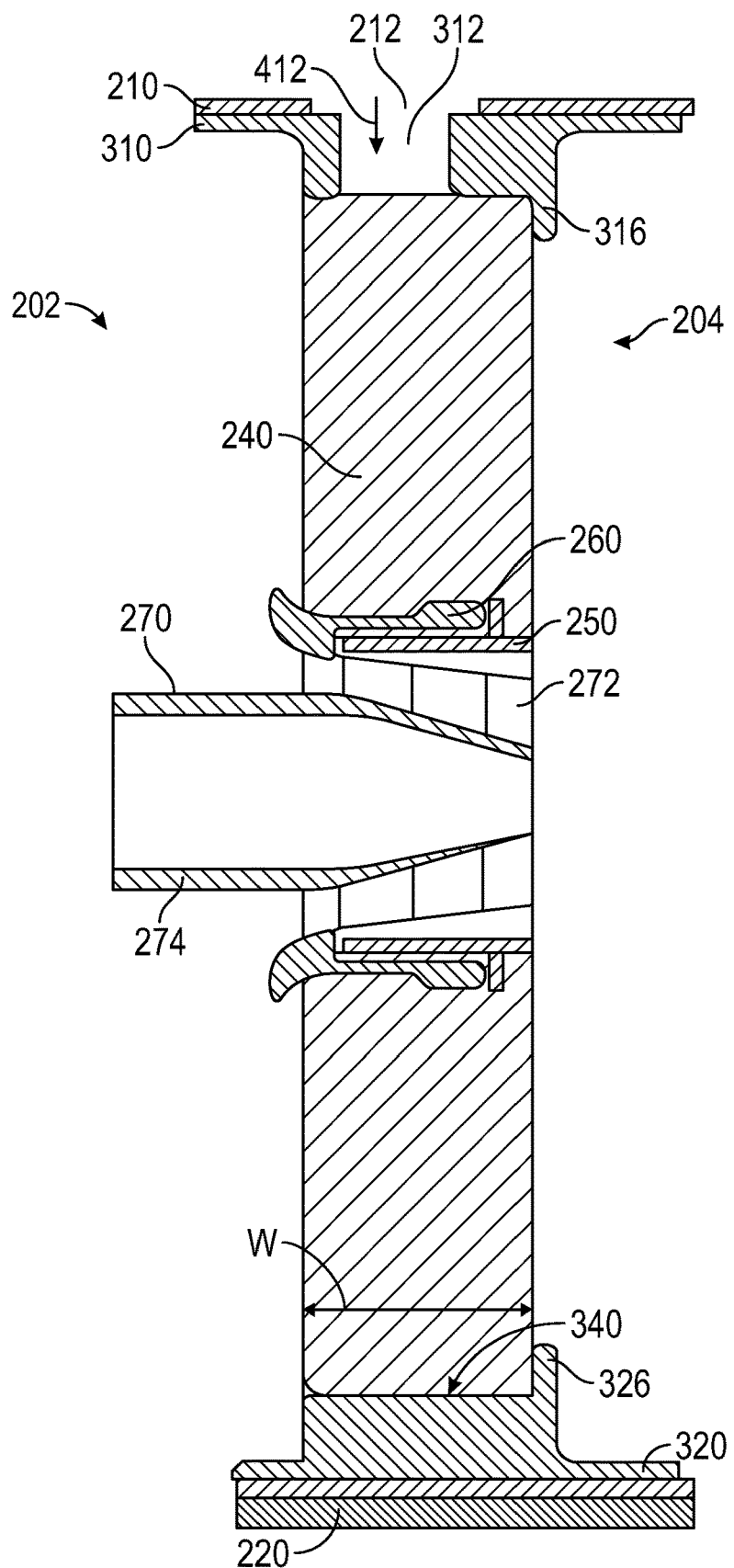
FIG. 4 illustrates a cross-sectional view of a micromixer panel, according to an embodiment.

FIG. 4 illustrates a cross-sectional view of a micromixer panel 240, cut along line A-A in FIG. 2, according to an embodiment. As illustrated, from first end 202 to lips 316 and 326, window 340 has an axial width W. Micromixer panel 240 has the same width W, such that micromixer panel 240 sits flush within window 340. In addition, aligned radial apertures 212 and 312 through outer liner 210 and outer ring 310, respectively, form a radial channel 412 from an area radially outward from fuel injection system 134 into window 340. It should be understood that radial apertures 214 and 314 would similarly form a radial channel from an area radially outward from fuel injection system 134 into window 340.

In an embodiment, a grommet 250 is fitted through the center of micromixer panel 240 to form an aperture through micromixer panel 240. A pilot body 270 may be mounted into grommet 250. A retaining ring 260 may couple with grommet 250 to fix pilot body 270 in place within grommet 250.

Pilot body 270 may comprise an axial swirler 272 and a nozzle 274. Swirler 272 provides a flow path for gas (e.g., air) from first end 202 to travel axially through micromixer panel 240 to second end 204, while swirling the gas along the flow path. Pilot nozzle 274 is a tubular structure, as depicted with an optional conical flared portion, that may be connected to a source of pilot fuel at first end 202. Pilot nozzle 274 is configured to inject pilot fuel into combustion chamber 136, for example, to stabilize the combustion process, and can be held in position by axial swirler 272 or other suitable structure.

Figure 5:
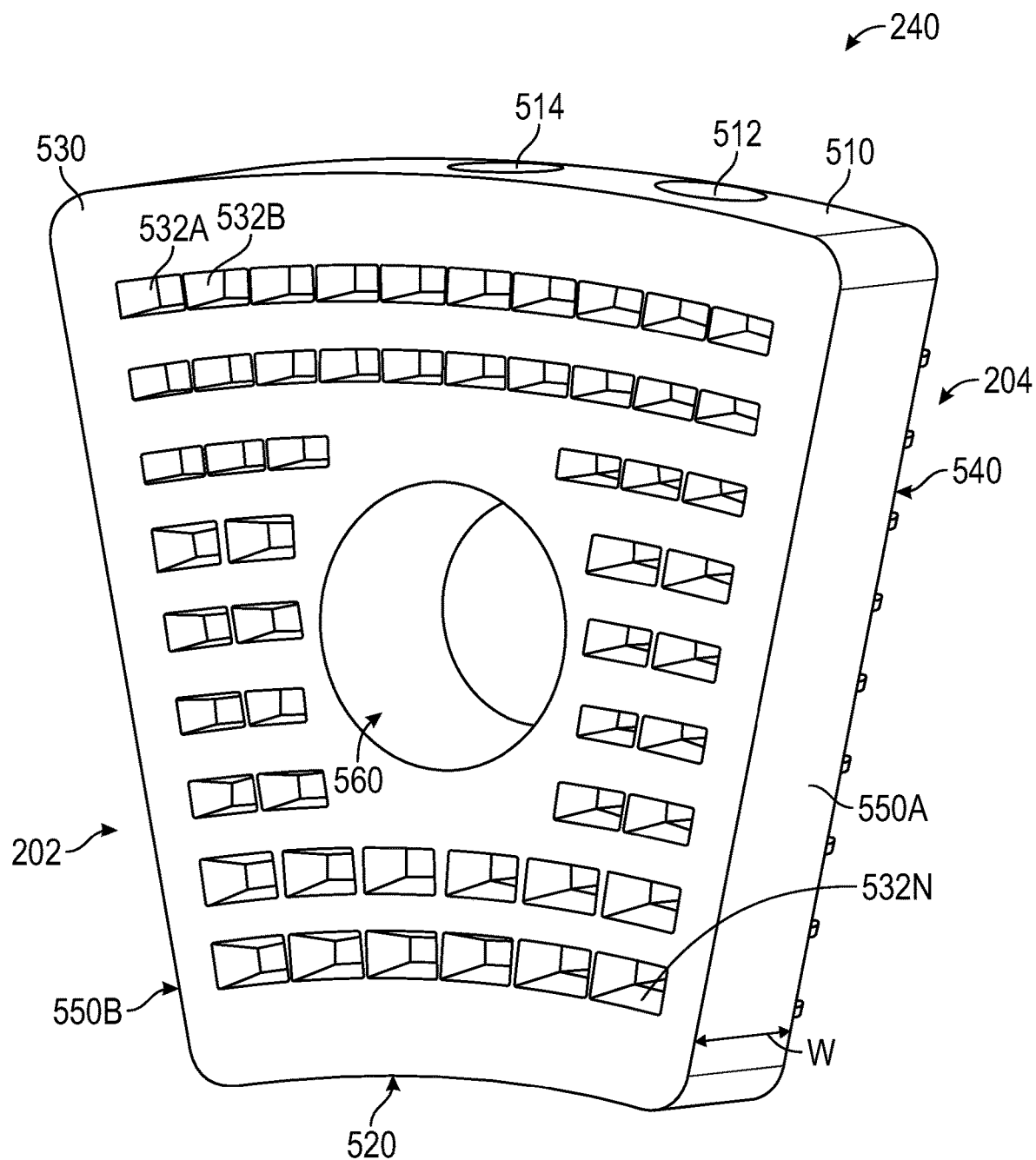
FIG. 5 illustrates a perspective view of the micromixer panel from one side, according to an embodiment.

FIG. 5 illustrates a perspective view of micromixer panel 240, shown in isolation, from first end 202, according to an embodiment. Grommet 250, retainer ring 260, and pilot body 270 have been removed, to reveal an aperture 560 through the center of micromixer panel 240. The main body of micromixer panel 240, illustrated in FIG. 5, may be constructed as a single piece using additive manufacturing and/or machining.

Micromixer panel 240 comprises a top side 510, a bottom side 520, a first side 530, a second side 540, and two lateral sides 550A and 550B. Top side 510 is a radially outward facing surface that is slightly curved radially outward in an arc to fit flush with the radially inner surface of outer ring 310, and bottom side 520 is a radially inward facing surface that is slightly curved radially outward in an arc to fit flush with the radially outer surface of inner ring 320. Lateral sides 550A and 550B have width W. Width W of lateral sides 550A and 550B may be uniform from top side 510 to bottom side 520. In an embodiment, first side 530 is the forward side of micromixer panel 240, corresponding to first end 202, and second side 540 is the aft side of micromixer panel 240, corresponding to second end 204.

Top side 510 of micromixer panel 240 may comprise a set of radial inlets, illustrated as a pair of radial inlets 512 and 514. Each radial inlet aligns with a radial channel formed by an aligned pair of radial apertures through outer liner 210 and outer ring 310. For example, radial inlet 512 aligns with radial channel 412 through radial apertures 212 and 312. Similarly, radial inlet 514 aligns with a radial channel through radial apertures 214 and 314. Consequently, a flow path is provided from an area radially outward from fuel injection system 134 into radial inlets 512 and 514. A fuel mixture may be supplied through these flow paths to an interior of each micromixer panel 240.

It is preferred that each inlet to micromixer panel 240 is through the radially outward facing surface of top side 510, as illustrated. However, in an alternative embodiment, one or more inlets to micromixer panel 240 could be through the radially inward facing surface of bottom side 520. It should be understood that this would require aligned radial apertures to form radial channels through inner liner 220 and inner ring 320, and would require a supply system between inner liner 220 and shaft 102, which may not be as feasible as the illustrated embodiment. As yet another alternative, one or more inlets to micromixer panel 240 could be through first side 530, second side 540, lateral side 550A, and/or lateral side 550B.

First side 530 comprises a plurality of inlets 532, illustrated as 532A, 532B, . . . , 532N. In the illustrated example, there are fifty-four inlets 532. However, it should be understood that micromixer panel 240 may comprise any number of inlets 532, including fewer or more inlets 532. Each inlet 532 may have the same shapes and/or dimensions, or one or more inlets 532 may have different shapes and/or dimensions than one or more other inlets 532. While not a necessity, it is generally contemplated that inlets 532 are symmetrical across a bisecting radial axis of micromixer panel 240.

Figure 6:
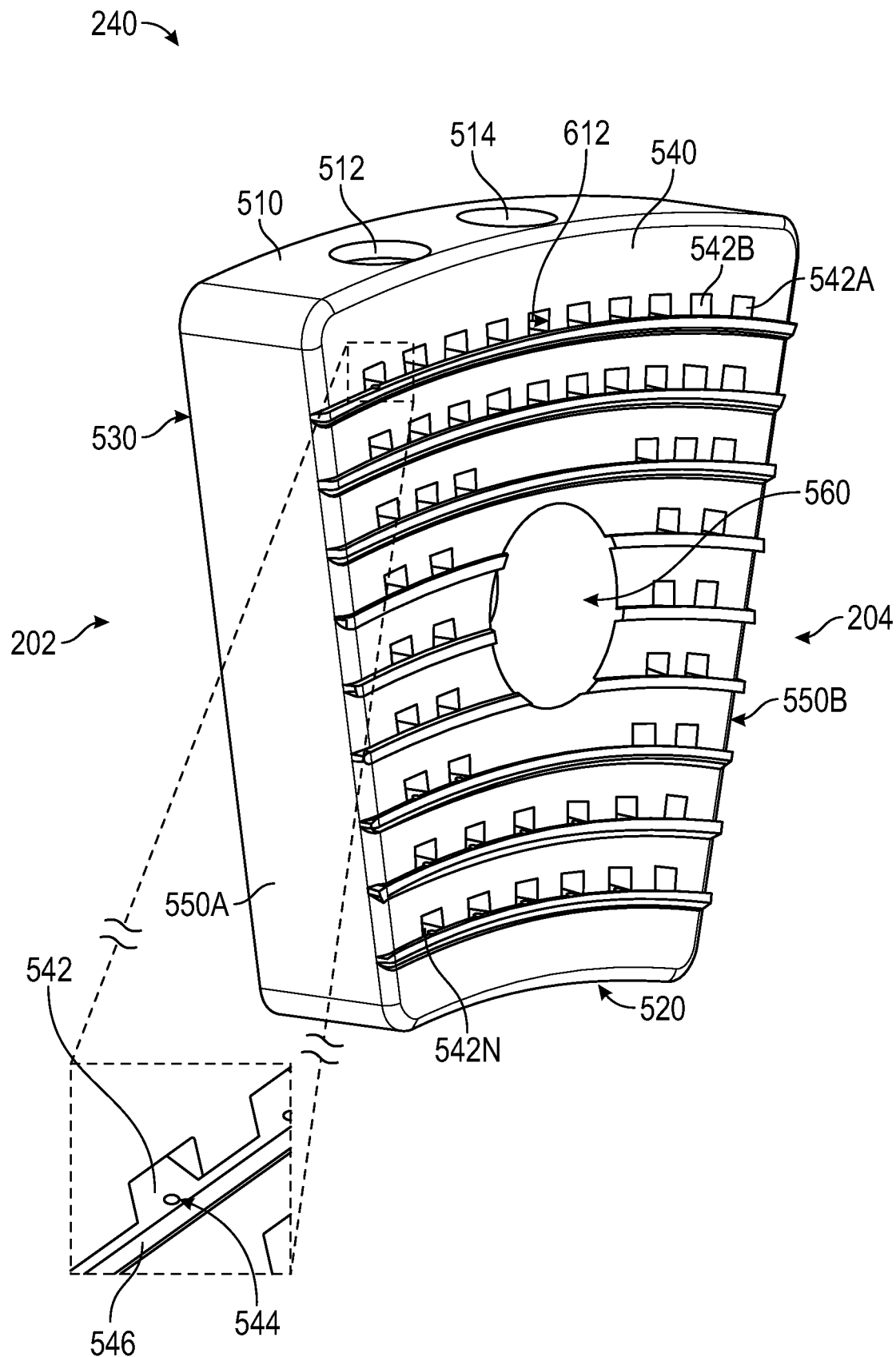
FIG. 6 illustrates a perspective view of the micromixer panel from the opposite side, according to an embodiment.

FIG. 6 illustrates a perspective view of micromixer panel 240, shown in isolation from second end 204, according to an embodiment. Second side 540 comprises a plurality of outlets 542, illustrated as 542A, 542B, . . . , 542N. The number of outlets 542 on second side 540 should match the number of inlets 532 on first side 530. Each outlet 542 corresponds to one inlet 532, and is in fluid communication with the corresponding inlet 532. In other words, each pair of corresponding inlet 532 and outlet 542 forms an axial channel 612 through micromixer panel 240. Gas, such as air, may flow from first end 202 into each inlet 532, through the channel, and out the corresponding outlet 542 to second end 204. These channels may be substantially evenly distributed throughout the available area of micromixer panel 240, for example, in a grid pattern with arced rows and radial columns. However, other patterns and arrangements are possible.

As illustrated, inlets 532, outlets 542, and channels 612 between inlets 532 and outlets 542 may have a rectangular shape. However, in alternative embodiments, inlets 532, outlets 542, and/or channels 612 may have alternative shapes, such as square, circular, elliptical, triangular, trapezoidal, or the like. In addition, inlets 532 may have the same shape and/or dimensions as their corresponding outlets 542, or different shapes and/or dimensions from their corresponding outlets 542.

Each outlet 542 may have a corresponding fuel jet 544. In the illustrated embodiment, a fuel jet 544 is positioned at the trailing edge of the corresponding outlet 542. While fuel jet 544 is illustrated as extending through the radially inward-most surface of outlet 542, each fuel jet 544 could alternatively extend through the radially outward-most surface of outlet 542 or through a lateral side surface of outlet 542. In addition, while only a single fuel jet 544 is illustrated for each outlet 542, each outlet 542 could have two or more corresponding fuel jets 544. Fuel jet 544 may be positioned anywhere within channel 612, but is preferably positioned slightly upstream from outlet 542, at outlet 542, or slightly downstream from outlet 542. For example, for each row of outlets 542, second side 540 could comprise a lip 546, positioned radially inward or radially outward from that row of outlets 542, and extending downstream from second side 540. In this case, each fuel jet 544, for each outlet 542 in a row, may be positioned in lip 546 for that row, slightly downstream from the respective outlet 542, and may be configured to inject fuel into the flow path defined by the respective channel 612 as that flow path exits the respective outlet 542.

Each fuel jet 544 may be connected to an internal fuel feed within micromixer panel 240 that is in fluid communication with one of inlets 512 or 514. Thus, fuel may be fed into one or more internal fuel feeds via one or more of inlets 512 or 514, such that the fuel is ejected by one or more fuel jets 544 into the flow of gas exiting the corresponding outlet(s) 542. Fuel jet 544 may be a plain orifice that is oriented radially (e.g., orthogonally to the flow path through outlet 542) or at any other acute angle or other suitable angle with respect to the radial axis. Each fuel jet 544 may be identical in shape and dimensions, or one or more fuel jets 544 may have different shapes and/or dimensions from one or more other fuel jets 544.

Figure 7:
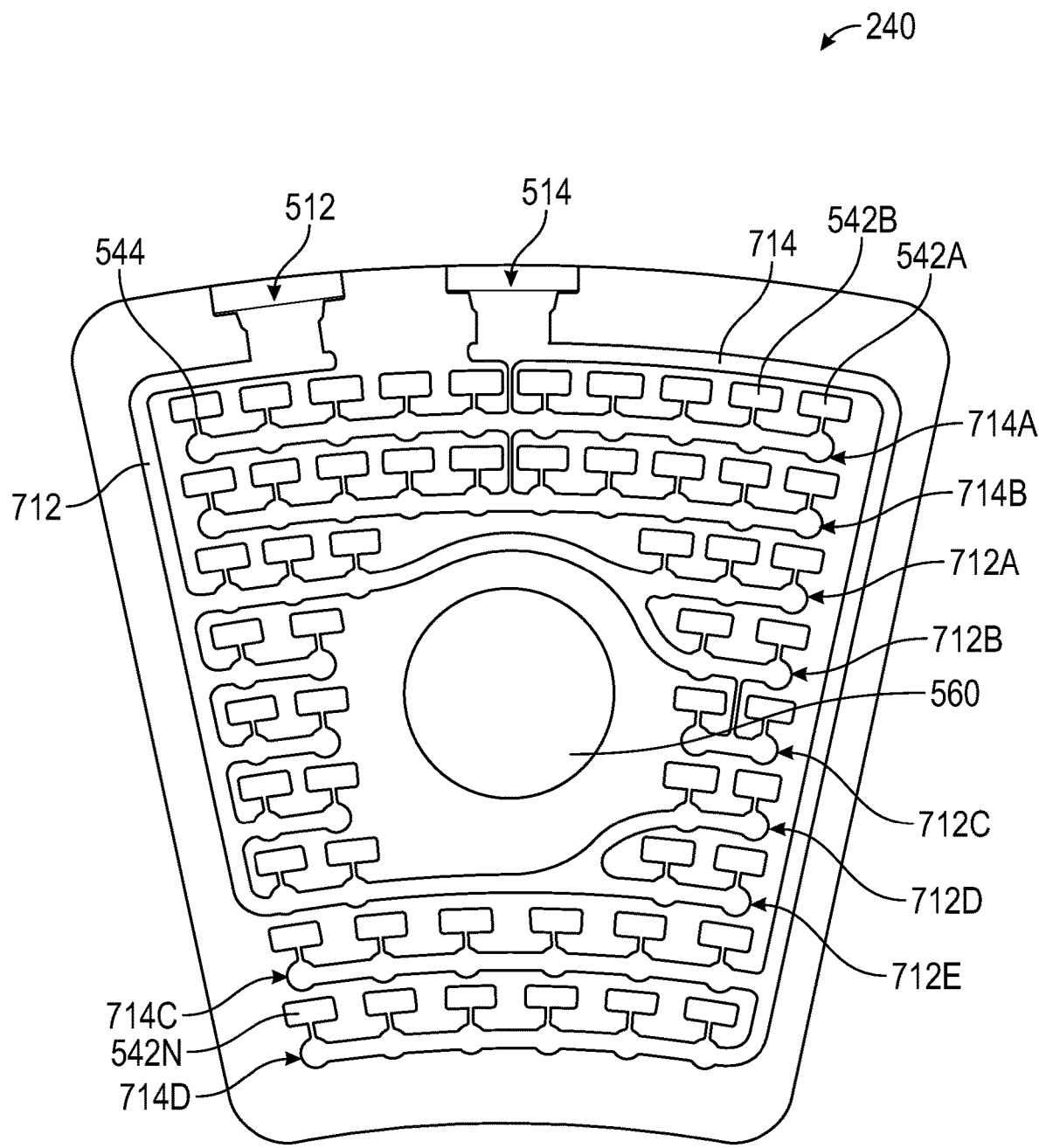
FIG. 7 illustrates a transparent view of the micromixer panel, according to an embodiment.

FIG. 7 illustrates a transparent view of micromixer panel 240, according to an embodiment. In an embodiment, micromixer panel 240 comprises at least two separate and distinct internal fuel feeds 712 and 714. First fuel feed 712 is supplied with fuel by first radial inlet 512, and second fuel feed 714 is supplied with fuel by second radial inlet 514. First fuel feed 712 comprises branches 712A, 712B, 712C, 712D, and 712E, along with several unlabeled branches, that supply fuel to various rows of fuel jets 544 in the radial middle of micromixer panel 240. Second fuel feed 714 comprises branches 714A, 714B, 714C, and 714D that supply fuel to rows of fuel jets 544 at the radially outer end and radially inner end of micromixer panel 240. Each internal fuel feed may be sized and otherwise configured to provide uniform fuel distribution to each fuel jet 544. As an example, the cross-sectional area of fuel feeds 712 and 714 may range from 6.5 to 65 square millimeters (0.01 to 0.1 square inches). However, it should be understood that the cross-sectional area of the internal fuel feeds in a particular implementation will depend on the applicable design objectives for that implementation. Likewise, other branch configurations are contemplated.

In the illustrated embodiment, micromixer panel 240 consists of two internal fuel feeds 712 and 714. However, in an alternative embodiment, micromixer panel 240 may consist of a single internal fuel feed, or may comprise three or more internal fuel feeds. It should be understood that the number of radial inlets (e.g., 512 and 514) and the number of radial channels (e.g., 412), formed by radial apertures in outer ring 310 (e.g., 312 and 314) and radial apertures in outer liner 210 (e.g., 212 and 214), will match the number of internal fuel feeds. In addition, each internal fuel feed (e.g., 712 and 714) may supply a distinct (i.e., non-overlapping) subset of fuel jets 544. Thus, subsets of fuel jets 544 may be turned on by supplying fuel to the respective internal fuel feed, and turned off by turning off the supply of fuel to the respective internal fuel feed. Each internal fuel feed may be turned on or off, independently of the other internal fuel feeds, to thereby control the amount of fuel that is collectively ejected from fuel jets 544, as well as the pattern of fuel that is ejected from fuel jets 544.

The pattern of the distinct subsets of fuel jets 544 on second side 540 of micromixer panel 240 may depend on the particular design goals. In the illustrated embodiment, a first subset of fuel jets 544, supplied by internal fuel feed 712, injects fuel into the middle rows of outlets 542 (i.e., nearer to aperture 560, representing the general center of micromixer panel 240), whereas a second subset of fuel jets 544, supplied by internal fuel feed 714, injects fuel into the outer rows of outlets 542 (i.e., farther from aperture 560, representing the general radial periphery of micromixer panel 240). In embodiments with three or more internal fuel feeds, the subsets of fuel jets 544 may radiate outward from the center, with a first subset nearest to the center, a second subset farther from the center and nesting the first subset, a third subset even farther from the center and nesting the first and second subsets, and so on and so forth. However, it should be understood that other patterns are possible.

INDUSTRIAL APPLICABILITY

Disclosed embodiments of fuel injection system 134 are configured to uniformly mix small, controlled streams of gas (e.g., air) and natural gas, low-hydrogen, and high-hydrogen fuels. At each outlet 542 of each micromixer panel 240, gas streams axially into combustion chamber 136, while a fuel jet 544 injects a stream of fuel (e.g., high-hydrogen fuel) radially or at an angle into the gas stream.

This design does not require any premixing or swirling flows. Rather, streams of gas and fuel are mixed right in outlets 542 of the micromixers, which are evenly distributed across the second side 540 of each micromixer panel 240. The even distribution across micromixer panel 240, the central pilot body 270, and/or the disclosed geometries may all help stabilize the flame.

In an embodiment, fuel injection system 134 may be operated in multiple stages, according to the number of internal fuel feeds. For example, the illustrated embodiment with two internal fuel feeds 710 and 720 may be operated in two stages. In the first stage, fuel may be supplied to inlet 512 to inject fuel through a first subset of fuel jets 544 connected to first internal fuel feed 710, while not supplying any fuel to inlet 514, such that no fuel is injected by a second subset of fuel jets 544 connected to second internal fuel feed 720. In the second stage, fuel may be supplied to both inlets 512 and 514 to inject fuel through both the first and second subsets of fuel jets 544. In a potential third stage, fuel may be supplied to inlet 514 to inject fuel through the second subset of fuel jets 544, while not supplying any fuel to inlet 512, such that no fuel is injected by the second subset of fuel jets 544. It should be understood that embodiments with three or more distinct internal fuel feeds and subsets of fuel jets 544 may operate in three or more stages in a similar manner.

The disclosed fuel injection system 134 may also facilitate simple installation and repair of fuel injection system 134 within gas turbine engine 100. For example, frame 230 and micromixer panels 240 are designed so that each micromixer panel 240 can be individually and independently mounted into and/or unmounted from fuel injection system 134. For example, a micromixer panel 240 may be slid axially into a window 340 of frame 230 from first end 202, and then fastened to frame 230 (e.g., via flange 242, lock plates, or other fastening means). Micromixer panel 240 is fixed in place by lips 316 and 326 on second end 204 and the fastening to frame 230 on first end 202. Conversely, a micromixer panel 240 may be removed by unfastening first end 202 of micromixer panel 240 from frame 230, and sliding micromixer panel 240 axially out of its corresponding window 340 from first end 202. Thus, each micromixer panel 240 is a modular component of fuel injection system 134 that can be easily installed, removed, replaced, and/or the like. If a particular micromixer panel 240 becomes defective or otherwise needs to be replaced, that micromixer panel 240 may be individually replaced without having to remove frame 230 or any other micromixer panels 240.

Other components of disclosed embodiments are similarly modular. For example, if a pilot body 270 becomes defective or otherwise needs to be replaced, retaining ring 260 may be removed to free pilot body 270, and pilot body 270 may be individually removed and replaced. It should be understood that grommets 250 and/or retaining rings 260 may be similarly installed, removed, and replaced.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of gas turbine engine. Hence, although the present embodiments are, for convenience of explanation, depicted and described as being implemented in a gas turbine engine that utilizes a hydrogen or hydrogen blend, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A fuel injection system comprising:
an annular frame having a plurality of windows circumferentially arranged around a longitudinal axis of the annular frame, wherein the annular frame comprises an outer ring and an inner ring; and
at least one micromixer panel, wherein each of the at least one micromixer panel is mounted within a respective window of the plurality of windows, and wherein each of the at least one micromixer panel comprises:
a plurality of channels from an upstream side to a downstream side, the downstream side opposite the upstream side, wherein each of the plurality of channels starts at a respective inlet of a plurality of inlets on the upstream side and terminates at a respective outlet of a plurality of outlets on the downstream side, and wherein each of the plurality of channels provides fluid communication from the respective inlet to the respective outlet;
a plurality of fuel jets, wherein each of the plurality of fuel jets is positioned within the respective outlet of the plurality of outlets, and wherein each of the plurality of fuel jets is configured to inject only fuel into the respective outlet;

at least one radial inlet through a surface of the micromixer panel, wherein the surface is a radially outward facing surface of the micromixer panel;

at least one internal fuel feed that provides fluid communication between the at least one radial inlet and at least one subset of fuel jets of the plurality of fuel jets, the at least one subset of fuel jets including more than one fuel jet of the plurality of fuel jets; and an aperture through a central portion of the micromixer panel, wherein the aperture is configured to fit a pilot body and is not in fluid communication with the at least one internal fuel feed.

2. The fuel injection system of claim 1, wherein each of the at least one micromixer panel further comprises:

a grommet mounted within the aperture; and the pilot body fitted within the grommet.

3. The fuel injection system of claim 2, wherein each of the at least one micromixer panel further comprises retaining ring mounted on the upstream side of the micromixer panel to fix the pilot body within the grommet.

4. The fuel injection system of claim 2, wherein, for each of the at least one micromixer panel, the pilot body comprises a pilot nozzle encircled by an axial swirler that swirls gas passing through the aperture from the upstream side to the downstream side, wherein the pilot nozzle extends upstream beyond the upstream side of the micromixer panel.

5. The fuel injection system of claim 1, wherein, for each of the at least one micromixer panel, the at least one radial inlet is at least two radial inlets, including a first radial inlet and a second radial inlet, the at least one internal fuel feed is at least two internal fuel feeds, including a first internal fuel feed and a second internal fuel feed, the at least one subset of fuel jets is at least two subsets of fuel jets, including a first subset of fuel jets and a second subset of fuel jets, the first internal fuel feed provides fluid communication between the first radial inlet and the first subset of fuel jets, and the second internal fuel feed provides fluid communication between the second radial inlet and the second subset of fuel jets that is different from the first subset of fuel jets.

6. The fuel injection system of claim 5, wherein, for each of the at least one micromixer panel, each fuel jet in the first subset of fuel jets is closer to the aperture than each fuel jet in the second subset of fuel jets.

7. The fuel injection system of claim 1, wherein the at least one micromixer panel is a plurality of micromixer panels.

8. The fuel injection system of claim 7, wherein each of the plurality of micromixer panels is configured to be mounted in and unmounted from the respective window of the plurality of windows independently from others of the plurality of micromixer panels.

9. The fuel injection system of claim 7, wherein the annular frame further comprises a plurality of spokes extending between the outer ring and the inner ring, wherein each of the plurality of windows is defined by the outer ring, the inner ring, and two adjacent spokes of the plurality of spokes.

10. The fuel injection system of claim 9, wherein the outer ring comprises a first lip extending radially inward, wherein the inner ring comprises a second lip extending radially outward, and wherein both the first lip and the second lip abut the downstream side of each of the plurality of micromixer panels.

11. The fuel injection system of claim 7, further comprising:

an outer liner; and an inner liner, wherein the annular frame is positioned between the outer liner and the inner liner along a radial axis that is orthogonal to the longitudinal axis.

12. A fuel injection system comprising:

an annular frame having a plurality of windows circumferentially arranged around a longitudinal axis of the annular frame, wherein the annular frame comprises an outer ring, an inner ring, and a plurality of spokes extending between the outer ring and the inner ring, wherein each of the plurality of windows is defined by the outer ring, the inner ring, and two adjacent spokes of the plurality of spokes; and a plurality of micromixer panels, wherein each of the plurality of micromixer panels is mounted within a respective window of the plurality of windows, and wherein each of the plurality of micromixer panels comprises:

a plurality of channels from a first side to a second side, the second side opposite the first side, wherein each of the plurality of channels provides fluid communication from an inlet of a plurality of inlets on the first side to an outlet of a plurality of outlets on the second side, a plurality of fuel jets, wherein each of the plurality of fuel jets is positioned within a respective outlet of the plurality of outlets, at least one radial inlet through a radially outward facing surface of the micromixer panel, at least one internal fuel feed that provides fluid communication between the at least one radial inlet and at least one subset of fuel jets of the plurality of fuel jets, the at least one subset of fuel jets including more than one fuel jet of the plurality of fuel jets, and an aperture through a central portion of the micromixer panel, wherein the aperture is configured to fit a pilot body and is not in fluid communication with the at least one internal fuel feed, wherein the outer ring of the annular frame comprises a plurality of radial apertures extending therethrough, and wherein each of the at least one radial inlet of each of the plurality of micromixer panels is aligned with a respective radial aperture of the plurality of radial apertures.

13. The fuel injection system of claim 12, wherein the at least one radial inlet of each of the plurality of micromixer panels is at least two radial inlets, including a first radial inlet and a second radial inlet, wherein the at least one internal fuel feed of each of the plurality of micromixer panels is at least two internal fuel feeds, including a first internal fuel feed and a second internal fuel feed, wherein the at least one subset of fuel jets of each of the plurality of micromixer panels is at least two subsets of fuel jets, including a first subset of fuel jets and a second subset of fuel jets, wherein, for each of the plurality of micromixer panels, the first internal fuel feed provides fluid communication between the first radial inlet and the first subset of fuel jets, and wherein, for each of the plurality of micromixer panels, the second internal fuel feed provides fluid communication between the second radial inlet and the second subset of fuel jets that is different from the first subset of fuel jets.

14. A fuel injection system comprising:

an annular frame having a plurality of windows circumferentially arranged around a longitudinal axis of the annular frame, wherein the annular frame comprises an outer ring and an inner ring; and at least one micromixer panel, wherein each of the at least one micromixer panel is mounted within a respective window of the plurality of windows, and wherein each of the at least one micromixer panel comprises:

a plurality of channels from an upstream side to a downstream side, the downstream side opposite the upstream side, wherein each of the plurality of channels starts at a respective inlet of a plurality of inlets on the upstream side and terminates at a respective outlet of a plurality of outlets on the downstream side, and wherein each of the plurality of channels provides fluid communication from the respective inlet to the respective outlet;

a plurality of fuel jets, wherein each of the plurality of fuel jets is positioned within the respective outlet of the plurality of outlets, and wherein each of the plurality of fuel jets is configured to inject only fuel into the respective outlet;

two or more radial inlets through a surface of a third side of the micromixer panel, the third side extending between the first side and the second side; and two or more internal fuel feeds, wherein each internal fuel feed of the two or more internal fuel feeds provides fluid communication between a respective radial inlet of the two or more radial inlets and a respective subset of fuel jets of the plurality of fuel jets;

an aperture through a central portion of the micromixer panel and not in fluid communication with the two or more internal fuel feeds;

a grommet mounted within the aperture; and a pilot body fitted within the grommet.

15. The fuel injection system of claim 14, wherein the at least one micromixer panel is a plurality of micromixer panels.

16. The fuel injection system of claim 15, wherein the annular frame further comprises a plurality of spokes extending between the outer ring and the inner ring, wherein each of the plurality of windows is defined by the outer ring, the inner ring, and two adjacent spokes of the plurality of spokes.

17. A gas turbine engine comprising:

a compressor;

a turbine; and a combustor positioned between the compressor and the turbine along a longitudinal axis of the gas turbine engine, wherein the combustor includes a fuel injection system, and wherein the fuel injection system comprises:

an outer liner comprising a plurality of first radial apertures, an inner liner, an annular frame positioned between the outer liner and the inner liner along a radial axis that is orthogonal to the longitudinal axis, wherein the annular frame includes:

an outer ring comprising a plurality of second radial apertures, an inner ring, and a plurality of spokes extending between the outer ring and the inner ring, wherein the outer ring, the inner ring, and pairs of adjacent spokes of the plurality of spokes define a plurality of windows circumferentially arranged around the longitudinal axis, and wherein each of the plurality of second radial apertures is radially aligned with a respective first radial aperture of the plurality of first radial apertures to define respectively a radial channel into a respective window of the plurality of windows, and a plurality of micromixer panels, wherein each of the plurality of micromixer panels is mounted within a respective window of the plurality of windows, and wherein each of the plurality of micromixer panels includes:

a plurality of axial channels from a first side to a second side of the micromixer panel, wherein each of the plurality of axial channels respectively provides fluid communication from an inlet of a plurality of inlets on the first side to an outlet of a plurality of outlets on the second side, a plurality of fuel jets, wherein each of the plurality of fuel jets is positioned within a respective outlet of the plurality of outlets, a radial inlet through a surface of the micromixer panel, wherein the radial inlet is aligned with a respective radial channel of the radial channels, an internal fuel feed, wherein the internal fuel feed provides respectively fluid communication between the radial inlet and one or more fuel jets of the plurality of fuel jets, an aperture through a central portion of the micromixer panel, a grommet mounted within the aperture, and a pilot body fitted within the grommet.

* * * * *